United States Patent
Svensson et al.

(10) Patent No.: US 9,944,265 B2
(45) Date of Patent: Apr. 17, 2018

(54) METHOD FOR CONTROLLING A BRAKE PRESSURE BOOSTER

(71) Applicants: FORD GLOBAL TECHNOLOGIES, LLC, Dearborn, MI (US); ROBERT BOSCH GMBH, Stuttgart (DE)

(72) Inventors: Thomas Svensson, Leichlingen (DE); Thomas Eichhorn, Schwieberdingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/905,481

(22) PCT Filed: Jul. 15, 2014

(86) PCT No.: PCT/EP2014/065139
§ 371 (c)(1),
(2) Date: Jan. 15, 2016

(87) PCT Pub. No.: WO2015/007728
PCT Pub. Date: Jan. 22, 2015

(65) Prior Publication Data
US 2016/0159333 A1 Jun. 9, 2016

(30) Foreign Application Priority Data
Jul. 16, 2013 (DE) .................. 10 2013 213 943

(51) Int. Cl.
*B60T 13/66* (2006.01)
*B60T 11/20* (2006.01)
*B60T 13/16* (2006.01)

(52) U.S. Cl.
CPC ............. *B60T 13/662* (2013.01); *B60T 11/20* (2013.01); *B60T 13/162* (2013.01)

(58) Field of Classification Search
CPC ....... B60T 13/662; B60T 11/20; B60T 13/162
See application file for complete search history.

(56) References Cited

U.S. PATENT DOCUMENTS 4,678,243 A * 7/1987 Leiber .................. B60T 8/3275
303/113.4
5,158,343 A 10/1992 Reichelt et al.
(Continued)

FOREIGN PATENT DOCUMENTS

DE 102011003144 A1 7/2012

*Primary Examiner* — Thomas Ingram
(74) *Attorney, Agent, or Firm* — Burgess Law Office, PLLC; Raymond L. Coppiellie

(57) ABSTRACT

A method for controlling a brake pressure booster with hydraulic brake boosting wherein the activation of an additional pressure source takes place upon exceeding a specified brake cylinder pressure threshold value. The threshold value lying between 50% and 100%, preferably between 70% and 80%, of a pressure limit value, from which the operating travel/brake pressure curve without additional brake pressure assistance has a knee point. Further upon exceeding a specified piston rod activation travel limit value, which lies at 20% to 100% of the available travel, preferably at 40% to 60% of the available travel. Furthermore, the speed of the vehicle, its lateral deceleration and its longitudinal deceleration can be used as criteria. Deactivation takes place on falling below a specified piston rod deactivation travel limit value. Based on selection of activation/deactivation criteria additional brake pressure boosting can be operational during braking maneuvers.

19 Claims, 1 Drawing Sheet

(56) References Cited

U.S. PATENT DOCUMENTS

| | | | | |
|---|---|---|---|---|
| 8,038,228 B2* | 10/2011 | Gronau | ............... | B60T 8/442 |
| | | | | 303/113.3 |
| 8,944,528 B2* | 2/2015 | Pursifull | ............... | B60T 8/441 |
| | | | | 123/179.3 |
| 2011/0270500 A1 | 11/2011 | Ummer et al. | | |
| 2013/0113270 A1* | 5/2013 | Pursifull | ............... | B60T 8/441 |
| | | | | 303/4 |
| 2013/0175851 A1* | 7/2013 | Honda | ............... | B60T 8/4275 |
| | | | | 303/6.01 |

* cited by examiner

METHOD FOR CONTROLLING A BRAKE PRESSURE BOOSTER

CROSS-REFERENCE TO RELATED APPLICATIONS

This application is a National Stage of International Application No. PCT/EP2014/065139, filed Jul. 15, 2015, which claims priority to German Patent Application No. DE 102013213943.8, filed Jul. 16, 2013, the contents of such applications being incorporated by reference herein.

BACKGROUND OF THE INVENTION

1. Field of the Invention

The present invention relates to a method for controlling a brake pressure booster utilizing hydraulic brake pressure boosting.

2. Description of Related Art

Hydraulically assisted brake pressure boosters are increasingly used instead of conventional vacuum-based brake pressure boosters. One reason for this is the additional cost of the vacuum supply in modern motor vehicles, because the intake manifold is not available as a vacuum source in diesel vehicles per se, and also an adequate intake manifold vacuum is no longer continuously available in vehicles with spark ignition because of occasional engine shutdown or operation with a wide open choke flap.

In contrast, a supply pump for an electronic stability controller (ESC) can be used as a pressure fluid source in an advantageous manner with hydraulically assisted brake pressure boosters (in general, a pressure reservoir is still necessary in addition). There are synergy effects from such dual use of the ESC pump unit.

Suitable brake pressure boosters are known e.g. from U.S. Pat. No. 4,678,243 A or DE 102011007095 A1, which are to be made the subject matter of this disclosure with respect to the detailed design of the brake pressure booster and the associated control arrangement.

U.S. Pat. No. 8,038,228 B2 uses the brake pressure gradient as a triggering criterion for an additional pressure source. U.S. Patent Publication No. US20110270500 A1 activates the additional pressure source depending on the pressure in the tandem brake master cylinder.

A common comparison test for brake systems of motor vehicles—which however is not part of legally specified tests—is the so-called AMS brake test, which refers to the German automobile magazine "Auto Motor and Sport." The test consists essentially of maximally accelerating a vehicle laden with the permissible loading ten times in immediate succession from 0 to 100 km/h and then decelerating back by means of full braking with the antilock braking system responding. This test places special requirements on the temperature behavior of the brake system, especially with respect to brake fade.

An AMS brake test of the hydraulic brake pressure assistance in current brake pressure boosters provides little or no benefit. A more detailed analysis shows this is apparently because the additional hydraulic pressure source is activated throughout; but the application points and activation criteria for activating the additional braking assistance with known brake controllers are so unfavorable that at the point in time of activation there is already such a high brake pressure that the common ESC pumps or the non-return valves disposed in the hydraulic path cannot transport any more brake fluid or supply the brake pressure booster.

SUMMARY OF THE INVENTION

One example of the present invention includes a method for controlling brake pressure in a motor vehicle. The method includes providing a brake cylinder including a piston rod and a hydraulic pressure source. Determining brake cylinder pressure and piston rod travel and activating the hydraulic pressure source when the brake cylinder pressure is between 50% and 100% of a pressure limit value and the piston rod travel limit is between 20% to 100% of the available travel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention includes a method for controlling a brake booster. An exemplary embodiment includes controlling hydraulically assisted brake boosting under extreme conditions, such as the AMS brake test, and in vehicle operating regions that have previously not been supported.

Figure 1:
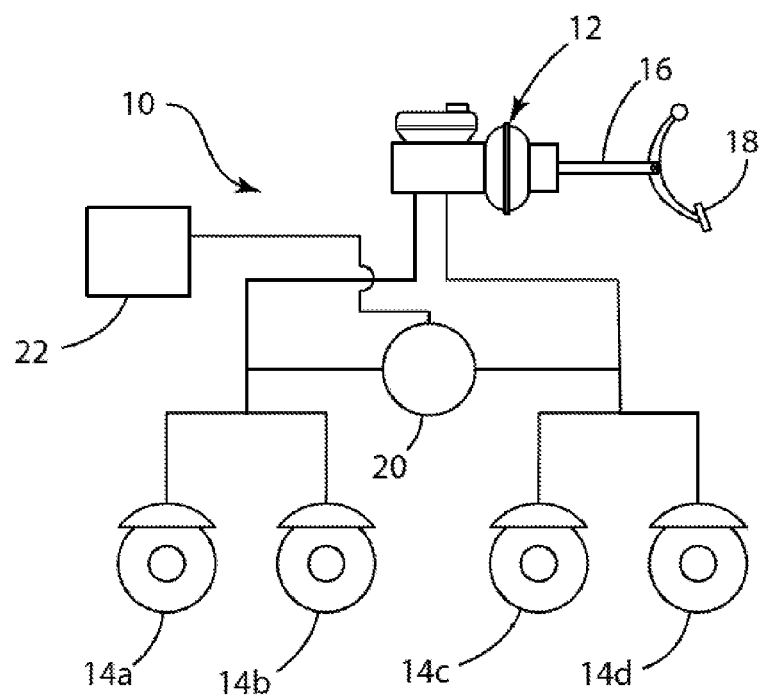
FIG. 1 is a schematic view of a brake system for use with an exemplary embodiment of the invention.

FIG. 1 schematically illustrates a brake system for use with an exemplary embodiment of the method for controlling brake pressure. The system having hydraulic brake boosting including a brake pressure booster. The brake pressure booster 10 includes a tandem brake master cylinder 12 for applying brake fluid to the service brakes 14a-14d of the motor vehicle. Typically, a piston rod 16 of the master cylinder 12 connects, directly or indirectly, to a brake pedal 16, whereby pressure applied to the brake pedal 18 applies brake fluid pressure through the master cylinder 12 to the service brakes 14a-14d. An additional hydraulic pressure source 20, (for example an ESC pump) when activated, supplies additional brake fluid pressure and assists the brake force applied by the brake pedal 18. Depending on various engine-operating parameters a control device or control unit 22 selectively activates or deactivates the additional hydraulic pressure source 20.

Figure 2:
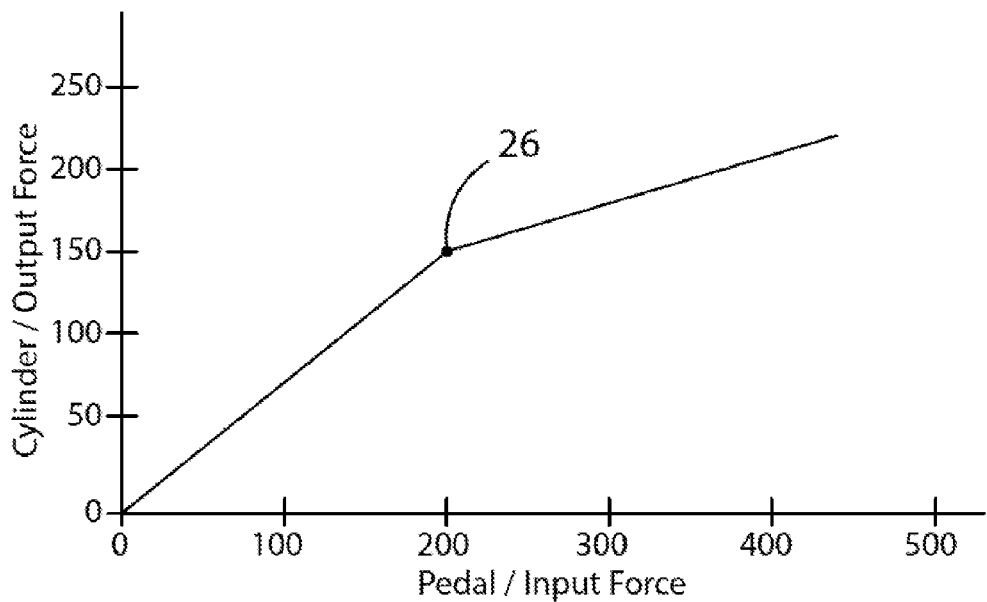
FIG. 2 is a pedal input force versus cylinder output force graph.

As set forth below, the control device or control unit monitors/records the pressure in the tandem brake master cylinder and the piston rod travel in the tandem brake master cylinder. The method includes activating the additional pressure source to supply additional fluid pressure to the vehicle brakes based on certain criteria, including:

a) exceeding a specified tandem brake master cylinder pressure threshold value lying between 50% and 100%, preferably between 70% and 80%, of a pressure limit value, from which the operating travel/brake pressure curve without additional brake pressure assistance includes a knee point 26, see FIG. 2, and b) exceeding a specified piston rod activation travel limit value of 20% to 100% of the available travel, preferably 40% to 60% of the available travel. Wherein piston rod travel value is understood as follows: greater travel value corresponds to increasing brake operation.

The knee point pressure value mentioned in criterion a) that relates to the corresponding percentage data represents a characteristic value in the operating force/pressure diagram, in which the curve includes a kink, see FIG. 2. The corresponding tandem brake master cylinder pressure threshold value is thus relatively low—due to limited available pedal travel.

Selecting a tandem brake master cylinder pressure threshold value that is relatively low and significantly below the knee point in criterion a) allows—in combination with the other criterion—a pressure build up in time if necessary, so that a pump valve opens in time, even under intensive brake operations, before too high a counter pressure prevents opening of the valve. The action of the pump can also be used before the knee point is reached as a result of said dimensioning in the event of rapid depression of the brake pedal, so that the driver does not notice the knee point in the form of a "hard brake pedal" or a slackening of the braking effect over the remaining brake pedal travel.

The other piston travel dependent criterion has the effect that, despite a relatively low tandem brake master cylinder pressure threshold value, activation does not occur at an unwanted point in time.

Moreover, preferably one or more, preferably all, of the following other additional driving dynamic criteria can be used for activating the additional pressure source:

c) exceeding a specified minimum longitudinal vehicle speed, which is preferably approximately 5 to 15 km/h, d) the presence of a smaller lateral deceleration than a specified deceleration limit value, which is preferably between −0.4 to −0.2 g (1 g=acceleration due to gravity 9.81 m/s2), and e) the presence of a greater longitudinal deceleration than a specified deceleration limit value, which is preferably −0.5 g (1 g=acceleration due to gravity 9.81 m/s2).

Thus it is especially prevented by the speed criterion (criterion c) that the additional braking assistance is activated for a longer time, e.g. when driving down a hill. The braking assistance is limited to driving states with stable driving dynamics by means of the lateral deceleration criterion d) and the longitudinal deceleration criterion e).

Operationally effective activation of the additional pressure source can be obtained by said criteria, especially by criteria a) and b), even when braking based on the AMS test cycle. In particular, the ESC pump can effectively support the braking process in practice in almost any braking scenario based on the activation criteria; i.e., both for slow and fast brake operations and in cases in which the brake force is increased during the course of the braking process.

In one example, a tandem brake master cylinder pressure threshold value below 100 bar is selected in step a).

Overall, satisfactory braking comfort is obtained by the present set of criteria.

As an alternative criterion to the piston rod activation travel limit value according to criterion b) the following criterion can also be used in an alternative design—b') exceeding a specified limit value of the variation with time of the tandem brake master cylinder pressure value for activation of the additional pressure source.

Preferably, deactivation of the additional pressure source takes place on falling below a specified piston rod deactivation travel value, wherein the piston rod deactivation travel value corresponds to the piston rod activation travel limit value minus a specified hysteresis value. Said additional hysteresis, which should prevent uncontrolled control oscillations, can e.g. be 5% of the travel.

Preferably, the deactivation of the additional pressure source thus takes place essentially independently of the tandem brake master cylinder-pressure, i.e., although both the pressure and the travel in the tandem brake master cylinder are used for the activation, the deactivation is independent of the pressure.

Rather this takes place (subject to the further operating limitations discussed below) depending on falling below a tandem brake master cylinder travel value. This has the advantage that, even in braking situations in which the brake pressure in the brake master cylinder falls to zero or almost zero caused by so-called brake fade or very rapid brake fluid flow, a useful brake force boost is maintained in said cases.

In the event of deactivation dependent on the brake pressure, the additional pressure source would be turned off in such situations. However, because preferably essentially only the travel is assessed for deactivation, switching off the additional pressure source by said effects in an actual inappropriate situation is prevented.

In contrast to deactivation, for activation, the pressure is used as a criterion. Additional braking assistance in such situations (brake fade etc.) is not an impairment, because before the occurrence of a situation such as brake fade or similar, in which the pressure in the brake master cylinder reduces, the brake pressure has previously exceeded the specified threshold value once in any case, and thus in the case of adequate piston or pedal travel the activation threshold was assigned at one point in any case.

In principle, it is nevertheless conceivable to monitor the brake pressure for deactivation. In this case, however, a pressure threshold value is provided for deactivation, which is significantly lower than the activation limit value in step a). For example, such a deactivation pressure threshold value could not be greater than 30% of the above-mentioned pressure limit value, i.e. at least 20% lower than said lower limit of 50% for activation.

As an additional operating limit, the additional pressure source is not activated or is immediately deactivated if the tandem brake master cylinder pressure value exceeds a maximum pressure value, which preferably lies between 180 and 220 bar. The common ESC pumps, which are used within the scope of this invention, can supply no more pressure fluid against such pressures in any case.

Furthermore, it can be provided that the additional pressure source is not activated or is immediately deactivated if the lateral deceleration exceeds a specified deceleration limit value of preferably between −1.2 and −1.4 g (g corresponds to the acceleration due to gravity). With such lateral deceleration values, more capacity of the ESC pump is needed for ESC interventions.

According to another aspect of the invention, a method of the above-mentioned type is proposed in which activation of the additional pressure source takes place on exceeding a specified tandem brake master cylinder pressure threshold value; and at the same time exceeding a specified piston rod activation travel limit value possibly while meeting other criteria—see e.g. the above criteria c) to e), and whereby deactivation of the additional pressure source takes place on falling below a specified piston rod deactivation pressure limit value essentially independently of the tandem brake master cylinder pressure. As already mentioned above, a pressure-independency can also mean that a relatively low-pressure threshold value is selected for a pressure-dependent deactivation, e.g. 30% of the pressure limit value or less.

A brake pressure booster arrangement designed for implementing the above-described method is proposed within the scope of the invention. The brake pressure booster arrangement includes for control—in general microprocessor-controlled—of suitable sensors, especially a pressure sensor in the region of the tandem brake master cylinder as well as a sensor for the piston rod travel, wherein the value can be concluded from a brake pedal operating travel sensor.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for controlling a brake pressure booster with hydraulic brake pressure boosting in a motor vehicle, the brake pressure booster comprising:
    providing a tandem brake master cylinder connected directly or indirectly via a piston rod to a brake pedal for applying brake fluid to the service brakes of the motor vehicle;
    providing an additional hydraulic pressure source that can be selectively activated or deactivated by means of a control device depending on various engine operating parameters and whose pressure fluid in the case of activation assists the brake pressure applied by the brake pedal; and
        recording at least the pressure in the tandem brake master cylinder and the piston rod travel of the tandem brake master cylinder by the control device wherein activation of the additional pressure source takes place with the cumulative presence of at least the following criteria:
    a) exceeding a specified tandem brake master cylinder pressure threshold value of between 50% and 100% of a pressure limit value, from which the operating travel/brake pressure curve comprises a knee point without additional brake pressure assistance, and
    b) exceeding a specified piston rod activation travel limit value of 20% to 100% of the available travel.

2. The method of claim 1 including the step of activating the additional pressure source when one or more of the following additional driving dynamics criteria are present:
    c) exceeding a specified minimum longitudinal vehicle speed, which is preferably approximately 5 to 15 km/h;
    d) the presence of a lower lateral deceleration than a specified deceleration limit value, which is preferably between −0.4 g and −0.2 g (g=9.81 m/s$^2$); and
    e) the presence of a higher longitudinal deceleration than a specified deceleration limit value, which is preferably −0.5 g (g=9.81 m/s$^2$).

3. The method of claim 1, including the step of using as an alternative criterion
    b') exceeding a specified limit value of the variation with time of the tandem brake master cylinder pressure value instead of the piston rod activation travel limit value in step b).

4. The method of claim 1, including the step of selecting the tandem brake master cylinder pressure threshold value below 100 bar.

5. The method of claim 1, including the step of deactivating the additional pressure source upon falling below a specified piston rod deactivation travel limit value, wherein the piston rod deactivation travel limit value corresponds to the piston rod activation travel limit value minus a specified hysteresis value.

6. The method of claim 5
    wherein the step of deactivating the additional pressure source is controlled independently of the tandem brake master cylinder pressure, or, if a pressure threshold value is provided, on falling below which deactivation should occur, that the deactivation pressure threshold value is not more than 30% of the pressure limit value.

7. The method of claim 1,
    wherein the additional pressure source is not activated or is immediately deactivated if the tandem brake master cylinder pressure value exceeds a maximum pressure value that preferably lies between 180 and 220 bar.

8. The method of claim 1,
    wherein the additional pressure source is not activated or is immediately deactivated if the longitudinal deceleration exceeds a specified deceleration limit value of preferably between −1.2 g to −1.4 g (g=9.81 m/s$^2$).

9. The method of claim 1 wherein the specified tandem brake master cylinder pressure threshold value is between 70% and 80% of a pressure limit value.

10. The method of claim 1 wherein the specified piston rod activation travel limit value is between 40% to 60% of the available travel.

11. The method of claim 1 wherein the specified tandem brake master cylinder pressure threshold value is between 70% and 80% of a pressure limit value; and
    the specified piston rod activation travel limit value is between 40% to 60% of the available travel.

12. A method for controlling a brake pressure booster with hydraulic brake boosting in a motor vehicle, wherein the brake pressure booster comprises a tandem brake master cylinder connected by means of a piston rod directly or indirectly to a brake pedal for applying brake fluid to the service brakes of the motor vehicle, and a hydraulic additional pressure source that can be selectively activated or deactivated by means of a control device depending on various engine operating parameters, whose pressure fluid in the case of activation assists the brake pressure applied by the brake pedal, and wherein at least the pressure in the tandem brake master cylinder and the piston rod travel of the tandem brake master cylinder are recorded by the control device, wherein
    activation of the additional pressure source takes place on exceeding a specified tandem brake master cylinder pressure threshold value and at the same time exceeding a specified piston rod activation travel limit value, and that deactivation of the additional pressure source takes place on falling below a specified piston rod deactivation travel limit value independent of the tandem brake master cylinder pressure.

13. A method for controlling brake pressure comprising:
    providing a brake cylinder including a piston rod;
    providing a hydraulic pressure source;
    determining brake cylinder pressure and piston rod travel; and
    activating said hydraulic pressure source when the brake cylinder pressure is between 50% and 100% of a pressure limit value and the piston rod travel limit is between 20% to 100% of the available travel.

14. The method of claim 13 including the step of activating said hydraulic pressure source when the brake cylinder pressure is between 70% and 80% of the pressure limit value and the piston rod travel limit is between 40% to 60% of the available travel.

15. The method of claim 14 including the step of selecting the brake cylinder pressure limit value between 180 and 220 bar.

16. The method of claim 13 including the step of activating the additional pressure source when one or more of the following additional driving dynamics criteria are present:

exceeding a specified minimum longitudinal vehicle speed, which is preferably approximately 5 to 15 km/h;

the presence of a lower lateral deceleration than a specified deceleration limit value, which is preferably between −0.4 g and −0.2 g (g=9.81 m/s$^2$); and the presence of a higher longitudinal deceleration than a specified deceleration limit value, which is preferably −0.5 g (g=9.81 m/s$^2$).

17. The method of claim 13 wherein the step deactivating the additional pressure source takes place on falling below a specified piston rod deactivation travel limit value, wherein the piston rod deactivation travel limit value corresponds to the piston rod activation travel limit value minus a specified hysteresis value; and the additional pressure source is controlled independently of the brake cylinder pressure.

18. The method of claim 13 wherein the additional pressure source is not activated or is immediately deactivated if the brake cylinder pressure value exceeds a maximum pressure value that preferably lies between 180 and 220 bar.

19. The method of claim 13 wherein the additional pressure source is not activated or is immediately deactivated if the longitudinal deceleration exceeds a specified deceleration limit value of preferably between −1.2 g to −1.4 g, wherein g=9.81 m/s$^2$.

* * * * *